(12) United States Patent
Itzhaky

(10) Patent No.: US 6,450,204 B2
(45) Date of Patent: Sep. 17, 2002

(54) PIEZOELECTRIC ACTUATABLE VALVE

(75) Inventor: Itzhak M. Itzhaky, New York, NY (US)

(73) Assignee: Drei-s-Werk Praezisionswerkzeuge GmbH & Co. Fertigungs-KG., Schwabach (DE)

(*) Notice: Subject to any disclaimer, the term of this patent is extended or adjusted under 35 U.S.C. 154(b) by 0 days.

(21) Appl. No.: 09/734,465

(22) Filed: Dec. 11, 2000

(51) Int. Cl.[7] .......................... F16K 11/22; F16K 31/02
(52) U.S. Cl. ..................... 137/883; 251/129.06
(58) Field of Search ....................... 137/883; 251/129.06

(56) References Cited

U.S. PATENT DOCUMENTS

| 4,617,952 A | * | 10/1986 | Fujiwara et al. ............... 137/85 |
| 5,079,472 A | * | 1/1992 | Uhl et al. .................... 251/330 |
| 5,207,737 A | * | 5/1993 | Hanley et al. ................. 137/85 |
| 5,340,081 A | | 8/1994 | Wright |
| 5,628,411 A | * | 5/1997 | Mills et al. .................. 209/644 |
| 5,630,440 A | | 5/1997 | Knutson et al. |

FOREIGN PATENT DOCUMENTS

| DE | 33 20 907 A1 | 12/1984 |
| DE | 84 26 774.7 U1 | 12/1984 |
| DE | 33 37 234 A1 | 4/1985 |
| DE | 36 08 550 A1 | 9/1987 |
| DE | 39 35 474 A1 | 1/1991 |

* cited by examiner

Primary Examiner—John Fox
(74) Attorney, Agent, or Firm—Laurence A. Greenberg; Werner H. Stemer; Ralph E. Locher

(57) ABSTRACT

In the case of a piezoelectrically operable valve (1) with at least one valve channel (4, 5), which can be closed by means of a sealing element (14, 16) held on a piezoelectric bending transducer (7, 8), the bending transducer (7, 8) is held at both ends in the valve housing (2) to increase the sealing effect of the closed valve channel or valve channel to be closed (4, 5). In this case, a first end (7a, 8a) of the bending transducer (7, 8) is fixed in the valve housing (2), while the second end (7b, 8b) is guided movably in the longitudinal direction (12) of the transducer in a housing groove (11) on the opposite housing side (2b).

10 Claims, 4 Drawing Sheets

PIEZOELECTRIC ACTUATABLE VALVE

BACKGROUND OF THE INVENTION

Field of the Invention

The invention relates to a piezoelectrically operable valve with at least one valve channel, which can be closed by means of a sealing element held on a piezoelectric bending transducer.

DE 36 08 550 A1 discloses a piezoelectrically operable valve, into the valve housing of which at least three valve channels open out to form a three-way valve. The valve, which can be used as a pneumatic valve or hydraulic valve, has within its valve housing at least one piezoelectric bending transducer, the connecting end of which, for connecting an electric voltage source, is fixed in a narrow side of the housing. The free end of the bending transducer, protruding into the interior space of the housing, carries on its side facing the respective valve channel a sealing element for closing this valve channel.

In order, in an initial state or state of rest with an outflow channel open, to close an inflow channel lying opposite said outflow channel, the corresponding bending transducer is mechanically prestressed and/or pressed against the valve seat of the inflow channel by means of spring force. In this state, the opposite outflow channel is opened by a sealing element which is held by the same or a further bending transducer, that is fixed in the housing on the connection side, being situated opposite the valve seat of the outflow channel at a distance from it.

In the operating state, the connecting end of the bending transducer or of each bending transducer is connected to a voltage source, the free end of the bending transducer being deflected in the direction of the respective valve channel or in the opposite direction, depending on the polarity. As a result, the sealing element moved along with the free end of the bending transducer closes the outflow channel while the inflow channel is at the same time opened. As a result, a medium flowing into the valve housing via the inflow channel is carried away via a working channel, whereas in the state of rest, with the inflow channel closed, a medium flowing in via the working channel flows out of the valve housing via the outflow channel.

In the case of this known piezoelectrically operated valve there is the problem, in particular under extreme operating conditions, of inadequate tightness of the valve channel closed according to the operating state. Consequently, when a medium is passed via the valve at a high pressure and/or high flow rate, undesirably high leakage rates may occur as a result of inadequate sealing, in particular of the valve channel that is open in the state of rest and is to be closed by means of the excited bending transducer.

A piezoelectrically operated valve known from U.S. Pat. No. 5,630,440 has a bending transducer that is clamped in the housing at both ends and is consequently fixed by both its ends. As a result, a comparatively high restoring force or working force is admittedly achieved in comparison with fixing of just one end of the bending transducer. However, the fixing of the bending transducer at both ends has the considerable disadvantage of an only small, and therefore generally inadequate, deflection displacement or bending excursion.

SUMMARY OF THE INVENTION

The invention is therefore based on the object of specifying a piezoelectric valve, in particular a pneumatic valve, in which the valve channel to be blocked is reliably closed, while the disadvantages mentioned are avoided.

This object is achieved according to the invention by the features of claim 1. For this purpose, the second end of the bending transducer, lying opposite the fixed first end, is guided in a longitudinal groove provided in the valve housing. This guidance, and the mobility of the bending transducer in the excited state achieved as a result, permits a longitudinal movement of the bending transducer, while a lateral movement of the free end is prevented by the groove side walls forming stops on both sides for the free end when the bending transducer is excited.

In this case, the fixed end is expediently configured as a connecting end which can be connected to an electric voltage source for valve operation.

The invention is in this respect based on the idea that a reliable closing of the valve channel to be blocked, and consequently deactivated in each case, can be achieved even under extreme operating conditions, in particular in the case of a high pressure and a high flow rate of a medium flow to be controlled, by increasing the force, with at the same time a deflection displacement or bending excursion that is as great as possible. This increased pressing force with which the sealing element is pressed against the valve seat of the corresponding valve channel by means of the respective bending transducer can be produced by the bending transducer itself, with at the same time an adequate deflection displacement, if said bending transducer is held at both ends within the valve housing and at the same time is fixed only at one end, while the other end is merely supported in the manner of an abutment. As a result, an improvement in the operating behavior of the bending transducer and an increase overall in the operating reliability of the valve are achieved.

The invention is based here on the finding that, with the given connected voltage or operating voltage and accordingly with a constant bending moment of the piezoelectric transducer, the force produced by the latter increases with a decreasing lever arm. If the bending transducer is consequently held at both ends, the pressing force exerted by the sealing element on the valve seat of the corresponding valve channel as a result of a bending deflection of the bending transducer is distinctly greater in comparison with a bending transducer that is clamped at one end and freely movable at the free end. If in this case one of the ends of the bending transducer is guided in an axially movable manner, the deflection displacement is at the same time greater than in the case of a bending transducer fixed at both ends. Therefore, it is expedient to arrange the sealing element in the central region of the bending transducer, preferably with at least approximately the same distance both from the fixed end and from the movably guided end.

In order to achieve reliable closing of a valve channel already when it is in the initial state or state of rest in a particular simple and effective way, in an advantageous development the bending transducer is concavely bent in the direction of this valve channel in the de-energized state. The bending profile of the bending transducer in the de-energized or excitation-free state of rest is expediently achieved by the bending transducer itself being prestressed in the manner of a leaf spring. Such prestressing is in turn expediently achieved by a suitable production process. In this respect, a laminated bending transducer with a layer structure having at least one electrically conductive backing layer and a piezoceramic layer is taken as a basis and, by heating and subsequent cooling, leads to layers prestressed to varying degrees (prestressed layers) as a result of material-dependently different contraction properties. The different prestressing of the layers in turn leads to a bending deflection of the flat bending transducer about a bending axis running transversely with respect to its longitudinal sides and lying parallel to its narrow sides.

In a particularly preferred embodiment, two bending transducers are arranged running essentially parallel to each other within the valve housing. Their respective connecting end, which can be connected to an electric voltage source, for valve operation is in turn expediently the end that is held fixedly on the housing, while the respective free end is in turn held movably in the longitudinal direction. With respect to a central axis of the housing, the two bending transducers are convexly curved in the direction of the valve channel respectively assigned to them. In the de-energized state, a first valve channel is in this case closed by means of a sealing element, carried by a first bending transducer, while an opposite second valve channel is open. Lying opposite this second valve channel, at a distance from it, there is then a sealing element carried by the second bending transducer.

By applying the operating voltage with appropriate polarity, both bending transducers are excited, so that the first valve channel is opened and the second valve channel is closed. A medium flowing into the valve housing via an additional inflow channel is consequently led out of the valve housing via the second channel in the state of rest and via the first channel in the operating state. Depending on the mode of operation, a medium flowing in via the open second valve channel can flow away out of the valve housing via the inflow channel.

When a single bending transducer is used, in the de-energized state it is concavely bent in the direction of a first valve channel, a second valve channel, lying opposite said first valve channel, extending within the valve housing to within the effective proximity of the concave side of the bending transducer. In particular in this embodiment with only a single bending transducer, the latter carries a sealing element that is effective on both sides of its central region.

BRIEF DESCRIPTION OF THE DRAWINGS

Exemplary embodiments of the invention are explained in more detail below with reference to a drawing, in which.

DESCRIPTION OF THE PREFERRED EMBODIMENT

Figure 1:
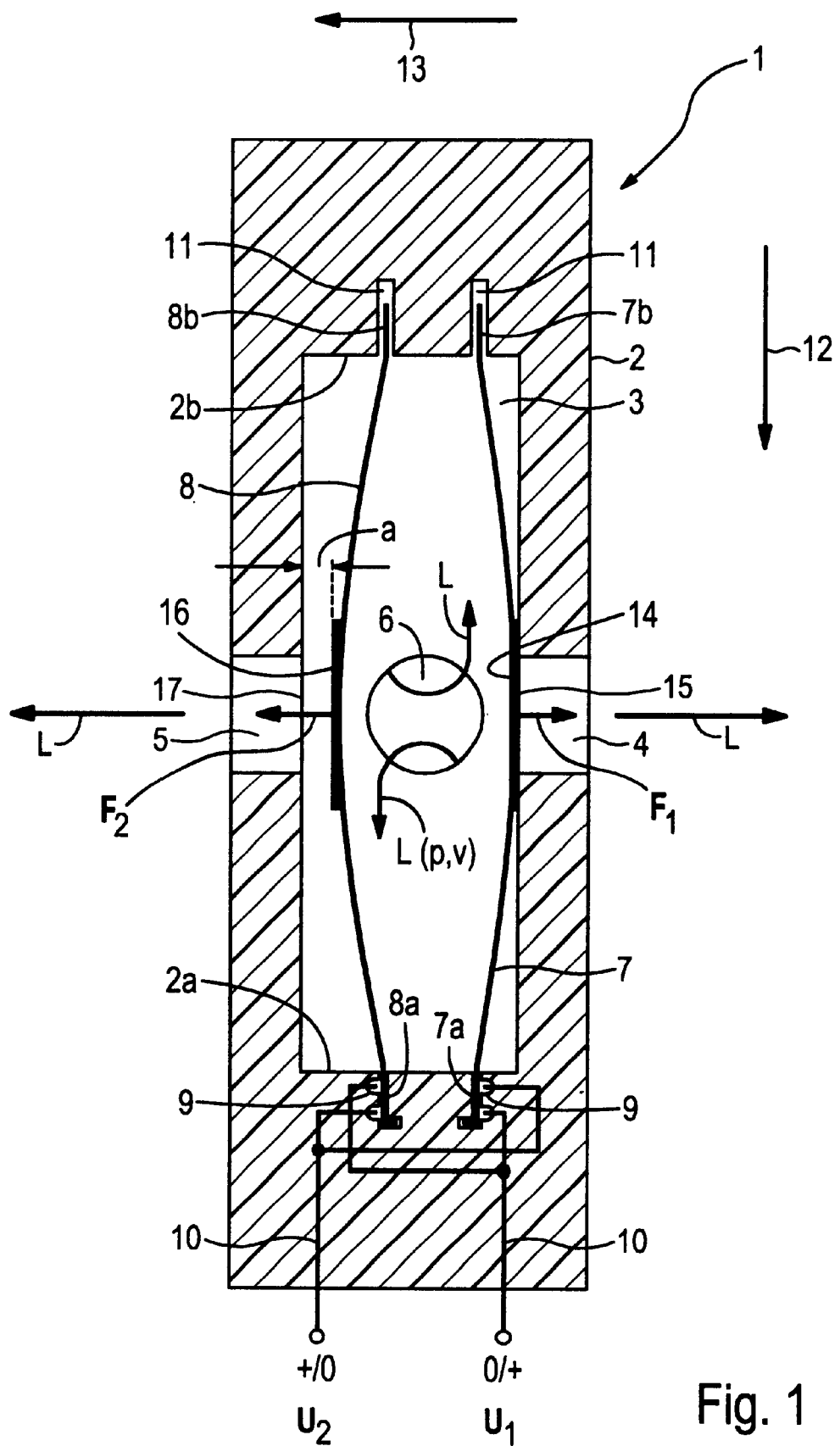
FIG. 1 shows in a sectional representation a first configurational variant of a piezo-electrically operable valve with two bending transducers held at both ends.

The same parts are provided with the same reference numerals in all the figures here.

Figure 2:
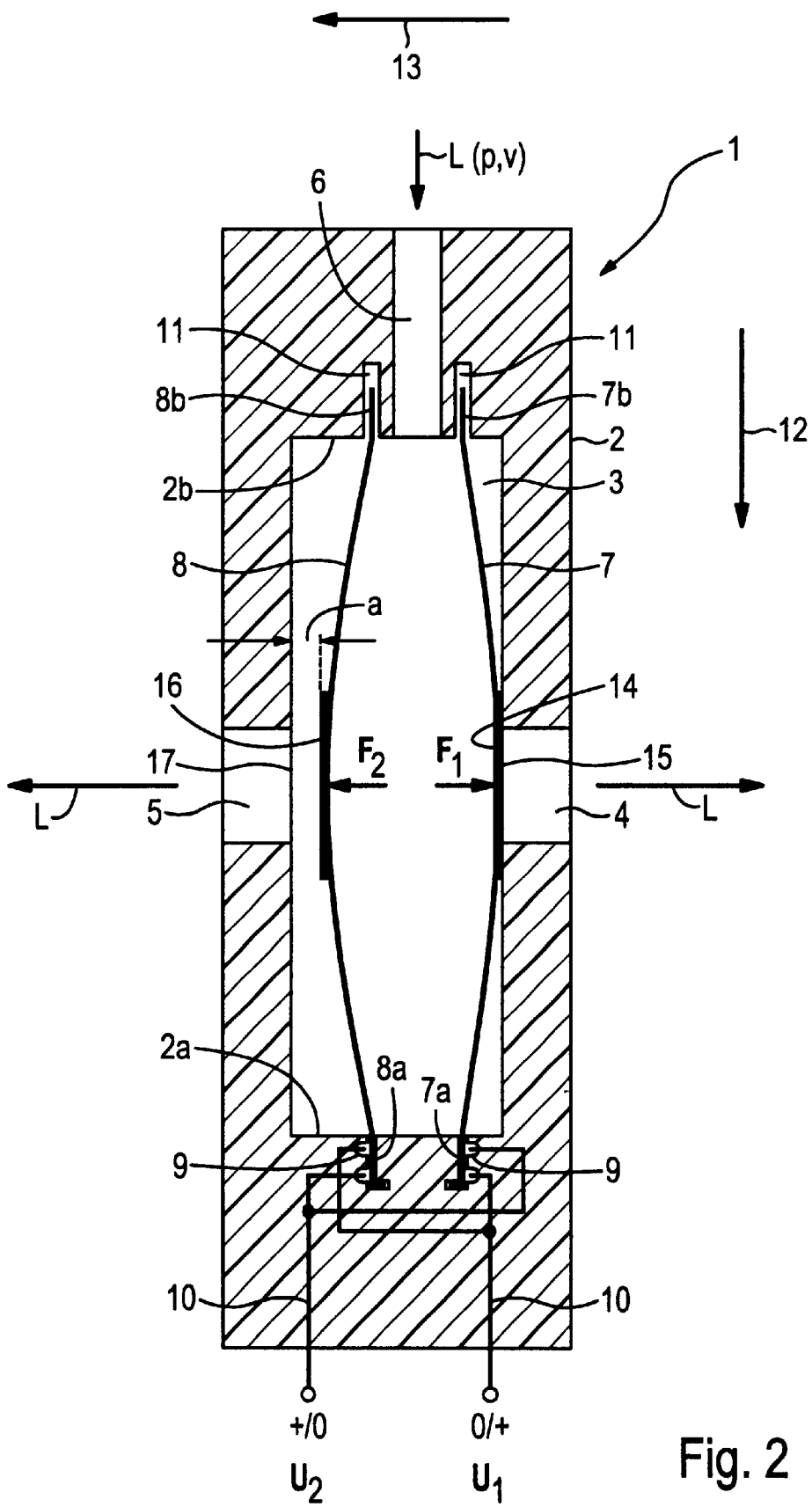
FIG. 2 shows a second configurational variant of the valve according to FIG. 1.

The piezoelectrically operable valve 1 according to FIGS. 1 and 2 has a valve housing 2, which preferably consists of plastic and is cuboidal, with a likewise cuboidal or else circular-cylindrical interior space 3. Two diametrically opposed valve channels 4 and 5 open out into the interior space 3. A further valve channel or inlet channel 6, opening out into the interior space 3 of the valve housing 2, runs transversely with respect to the two valve channels 4 and 5. Arranged in the interior space 3 of the valve housing 2 are two platelet-shaped bending transducers 7 and 8. Each bending transducer 7, 8 has a connecting end 7a, 8a and a free end 7b, 8b. The respective connecting end 7a, 8a of the bending transducer 7 and 8, respectively, is held in the region of a narrow side 2a of the valve housing 2 on the connection side and is fixed there. Connecting contacts 9, which are connected to a respective voltage source $U_1$ and $U_2$ via connecting lines 10, are led to the respective connecting end 7a, 8a of the bending transducer 7 and 8, respectively. The voltage sources supply a DC voltage of, for example, 200 V.

On the opposite narrow side 2b of the housing of the valve 1, the free ends 7b, 8b of the respective bending transducer 7 and 8, respectively, lie in housing grooves 11. Within these housing grooves 11, the free ends 7b, 8b of the bending transducers 7 and 8 are held movably in the longitudinal direction 12 of the transducer, which also corresponds to the longitudinal direction of the housing. The housing grooves 11 in this case form lateral stops for the respective free end 7b, 8b, in or counter to the transverse direction of the housing illustrated by the arrow 13.

In the state of rest or initial state represented in the exemplary embodiment, the bending transducers 7, 8 are de-energized and consequently excitation-free. In this state of rest, the right-hand valve channel 4 in the exemplary embodiment according to FIGS. 1 and 2 is closed. For this purpose, the bending transducer 7 carries in the central region of the outer side facing this valve channel 4 a sealing element 14, preferably consisting of plastic or rubber. This sealing element bears against the valve seat 15 of the valve channel 4 and seals the latter off on the inner side of the housing. The pressing force $F_1$ required for this purpose is applied by the bending transducer 7 itself, in that, in the state of rest, the latter is concavely curved in the direction of the valve seat 15 and thereby prestressed in the manner of a leaf spring by being fitted in a corresponding position.

The bending and curving profile represented of the respective bending transducer 7, 8 is achieved by a special production process, in which a layer structure with an electrically conductive backing layer, preferably in the form of a flat sheet-metal strip, and with a piezoceramic layer adhesively held on it is prestressed in a way not represented in any more detail by heating and subsequent cooling along the longitudinal direction 12 of the transducer.

The bending transducer 8 assigned to the (left-hand) valve channel 5, which transducer corresponds with respect to its shape and structure to the bending transducer 7, likewise carries a sealing element 16 in its central region. In the open state of the valve channel 5 represented, this sealing element is arranged at a distance a from the valve seat 17 of said valve channel. In the de-energized state of rest, this bending transducer 8 is also convexly curved in the direction of the valve seat 17 and consequently in the direction of the valve channel 5.

For operating the valve 1, the two bending transducers 7 and 8 are excited with appropriate polarity of the voltage sources $U_1$ and $U_2$. When this happens, the two bending transducers 7, 8 move in the direction or bending direction of the arrow 13, so that the sealing element 14 carried by the bending transducer 7 is lifted off the valve seat 15 and consequently opens the valve channel 4, while the sealing element 16 carried by the bending transducer 8 is pressed against the valve seat 17 and consequently closes the valve channel 5. The free ends 7b and 8b of the two bending transducers 7 and 8 can be displaced thereby in the longitudinal direction 12 on account of being secured within the housing grooves 11. In this arrangement, the free ends 7*b* and 8*b* are extended into the housing grooves 11 to such a depth that they cannot come out of the housing grooves 11 when there is a bending deflection of the bending transducers 7, 8 in the excited state.

Whereas in the state of rest the prestressing of the bent bending transducer 7 has the effect that the sealing element 14 carried by the latter is already pressed with an adequately high pressing force $F_1$ against the valve seat 15, the pressing force $F_2$ required for closing the valve channel 5, which is open in the state of rest, is achieved by the securement of the bending transducer 8 at both ends in combination with the central arrangement of the sealing element 16. The reason for this is an increase in force brought about by a particularly favorable lever arm effect with a constant bending moment.

During the operation of the pneumatic valve 1, configured in the exemplary embodiment as a three-way valve, air L flowing into the valve housing 2 at a given pressure p and at a given flow rate v via the inlet channel 6 is carried away out of the valve housing 2 via the valve channel 5, which is open in this de-energized state of rest. The inflow channel 6 may in this case be led into the interior space 3 in the way according to FIG. 1 through a longitudinal side of the valve housing 2 at least approximately at the same height as the two diametrically opposed valve channels 4 and 5. Alternatively, the inlet channel 6 may be led into the interior space 3 in the way according to FIG. 2 through the narrow side 2*b* of the valve housing 2, provided with the housing grooves 11. In the case of this embodiment, the inlet channel 6 expediently runs between the two housing grooves 11 and consequently opens out between the two bending transducers 7 and 8 into the interior space 3.

For switching over the valve 1, the two bending transducers 7 and 8 are excited by applying an operating voltage U with appropriate polarity of the voltage sources $U_1$ and $U_2$ and are deflected in the same direction (bending direction) 13. As this happens, the valve channel 4, which is closed in the state of rest, is opened, while the valve channel 5, which is open in the state of rest, is closed. The air L flowing into the valve housing 2 via the inlet channel 6, is consequently carried away via the valve channel 4. Appropriate polarity of the voltage sources $U_1$ and $U_2$ also allows both valve channels 4 and 5 to be opened or closed.

Figure 3:
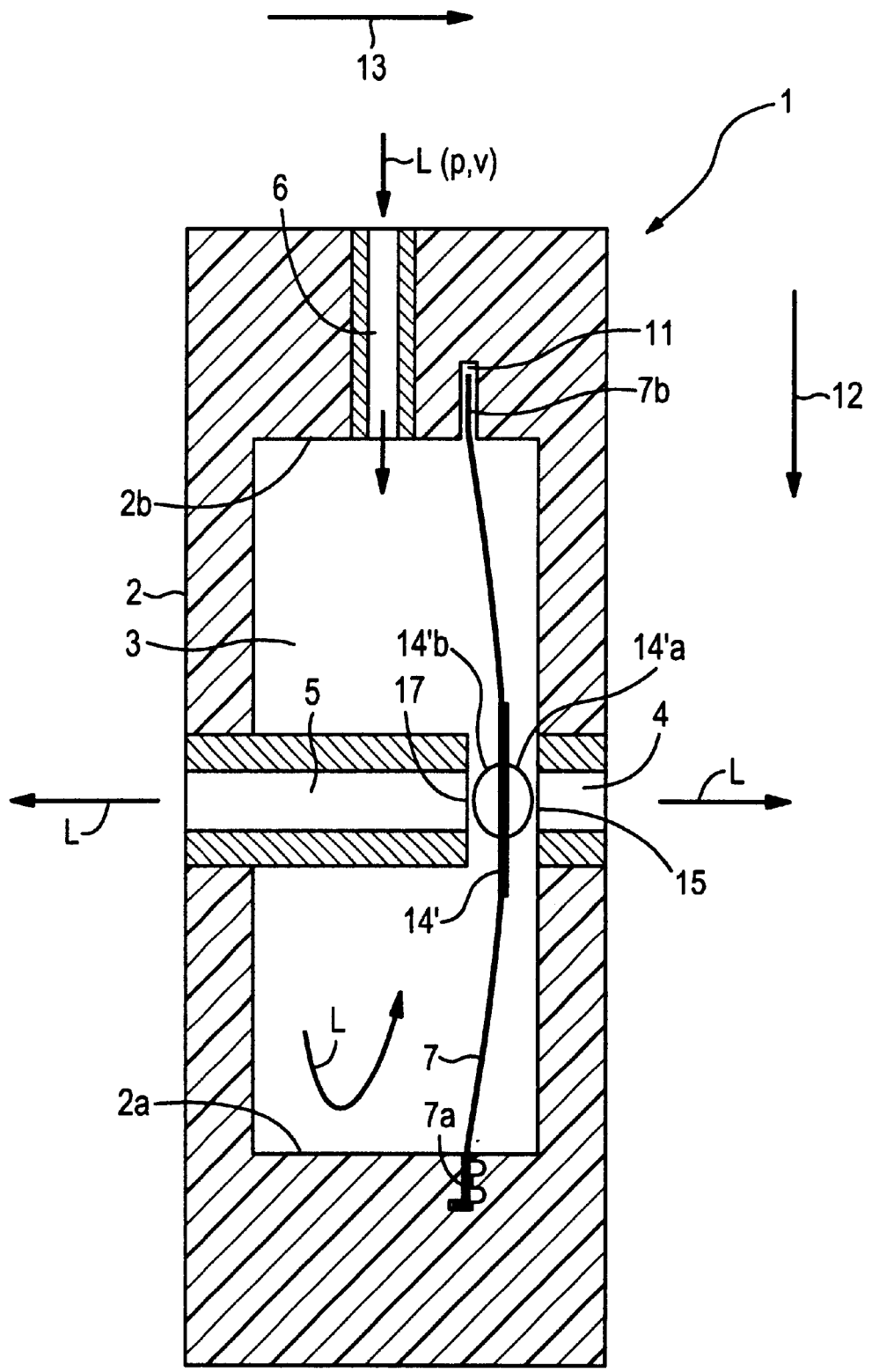
FIG. 3 shows in a representation according to FIGS. 1 and 2 a piezoelectrically operable valve with a single bending transducer that is held at both ends.

In the case of the variant represented in FIG. 3 without voltage connections 9, 10, with a single bending transducer 7, which in turn is held at both ends in the valve housing 2, in the exemplary embodiment the central region of said transducer is curved or bent in the direction of the valve channel 4 in the state of rest. The valve channel 5 lying opposite the valve channel 4 is lengthened in the interior space 3 in the direction toward the sealing element 14' and consequently extends to within the effective proximity of the bending transducer 7. The sealing element 14' which is placed on or applied to the bending transducer 7 and is effective both on the convex side and on the concave side of the latter is expediently configured in such a way that it is curved on both sides. Sealing curvatures 14'*a*, 14'*b* directed counter to each other are in this case expediently of a hemispherical design. As a result, a particularly reliable sealing effect is achieved even with a comparatively small clear width or a comparatively small inside diameter of the valve channels 4, 5.

During the operation of the pneumatic valve 1 according to FIG. 3, in the de-energized state—or else with appropriate polarity of the voltage U (not represented)—the sealing element 14' is pressed against the valve seat 15, and consequently the valve channel 4 is closed, while the valve channel 5 is open, by means of the pre-stressed, bent bending transducer 7. By polarity reversal of the voltage U, the valve channel 5 is closed, and at the same time the valve channel 4 is opened, as a result of a bending deflection of the bending transducer 7 counter to the bending direction 13 represented.

Figure 4:
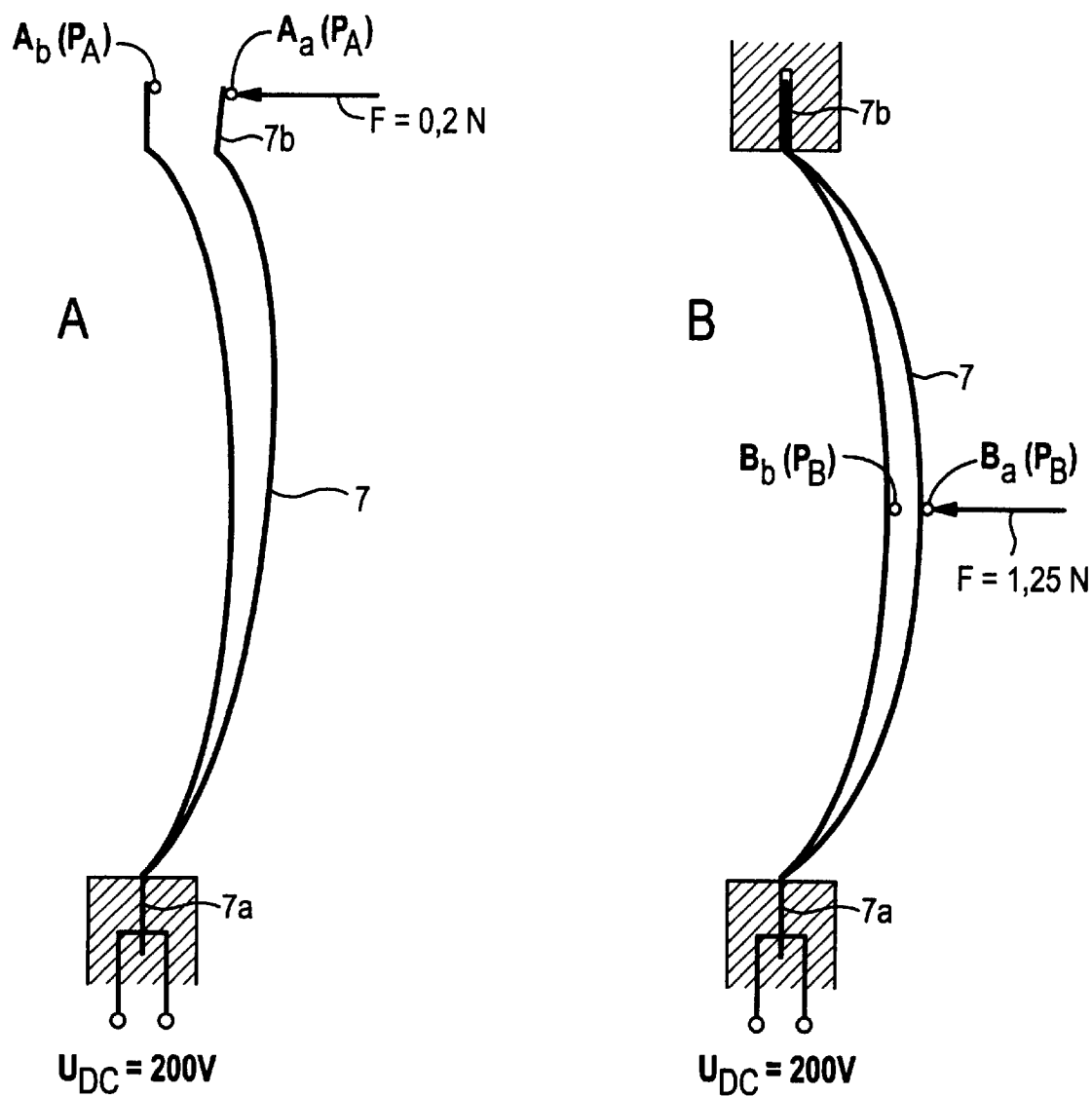
FIG. 4 shows in representations A and B trial constructions of a piezoelectric bending transducer held at one end and at both ends in the excited state and excitation-free state.

FIG. 4 illustrates trial structures A and B with a single bending transducer 7 restrained on the connection side, the following statements applying analogously to the bending transducer 8 according to FIGS. 1 and 2. Whereas according to trial A the free end 7*b* of the bending transducer 7 is freely movable in the manner of a boom, according to trial B its free end 7*b* is held such that it is merely longitudinally displaceable. In both trials A and B the same bending transducer 7 was used, the piezoceramic layer of which had the dimensions 38.00×12.70×0.20 and the backing layer of which had the dimensions 63.4×13.7×0.15 (length, width and thickness in mm). Measuring parameters were the required restoring force F to return the bending transducer 7 excited with a voltage U=200 V (DC) at the respective point $P_A$, $P_B$ from the deflected position $A_a$, $B_a$ into the excitation-free rest or neutral position $A_b$ or $B_b$, respectively.

In trial A, the restoring force F was registered at the free end 7*b* of the bending transducer at the measuring point $P_A$, while in trial B this was determined in the central region of the bending transducer 7 at the measuring point $P_B$. The restoring force F corresponding to the pressing force $F_{1,2}$ was measured in trial A at 0.2 N (corresponds to 20 g) and in trial B at 1.25 N (corresponds to 125 g).

This means that the arrangement according to the invention of a bending transducer 7, 8 held at both ends, with a sealing element 14, 16 arranged in its central region, within a piezoelectrically operated valve 1 achieves an increase many times over of the force $F_{1,2}$ for closing a valve channel 4 or 5 in comparison with a piezo element restrained at one end.

I claim:

1. A piezoelectrically operable valve, comprising:
   a valve housing formed with at least one valve channel and a housing groove, said valve housing having a length extending in a direction defining a longitudinal direction;
   a piezoelectric bending transducer; and
   a sealing element for closing said valve channel, said sealing element held on said bending transducer;
   said bending transducer having a first end fixed to said valve housing and a second end located opposite said first end, said second end being moveably guided in the longitudinal direction in said housing groove.

2. The piezoelectrically operable valve according to claim 1, wherein said first end is configured as a connecting end for connection to an electric voltage source to move said sealing element in an energized state.

3. The piezoelectrically operable valve according to claim 2, wherein said bending transducer is concavely bent toward said valve channel in a de-energized state.

4. The piezoelectrically operable valve according to claim 1, wherein said bending transducer is concavely bent toward said valve channel in a de-energized state.

5. The piezoelectrically operable valve according to claim 1, wherein said bending transducer has a region centrally located between said first end and said second end, and said sealing element is located in said central region of said bending transducer.

6. The piezoelectrically operable valve according to claim 1, comprising:
   a first valve channel defined by said at least one valve channel;
   a second valve channel formed in said valve housing opposite said first valve channel;
   a first piezoelectric bending transducer defined by said bending transducer and a first sealing element defined by said sealing element, said first bending transducer concavely bent toward said first valve channel;
   a second piezoelectric bending transducer concavely bent toward said second valve channel; and
   a second sealing element held on said second bending transducer;
   said first bending transducer sand said second bending transducer together defining a de-energized state in which said first sealing element closes said first valve channel and in which said second element is held at a distance away from said second valve channel.

7. The piezoelectrically operable valve according to claim 1, comprising an inlet channel opening out into said valve housing transversely with respect to said first valve channel and said second valve channel.

8. The piezoelectrically operable valve according to claim 1, comprising:
   a first valve channel defined by said at least one valve channel;
   a second valve channel formed in said valve housing opposite said first valve channel;
   said bending transducer having de-energized state in which said bending transducer is concavely bent toward said first valve channel and convexly bent with respect to said second valve channel; and
   said second valve channel formed with an extension within said valve housing extending proximate to said bending transducer.

9. The piezoelectrically operable valve according to claim 8, wherein:
   said bending transducer has a region centrally located between said first end and said second end;
   said bending transducer has a first side adjacent said first valve channel and a second side adjacent said second valve channel; and
   said sealing element is located at said central region and is effective on said first side and on said second side.

10. The piezoelectrically operable valve according to claim 9, wherein said sealing element is formed with a sealing curvature toward said first valve channel and a sealing curvature toward said second valve channel.

* * * * *

UNITED STATES PATENT AND TRADEMARK OFFICE
CERTIFICATE OF CORRECTION

PATENT NO. : 6,450,204 B2
DATED : September 17, 2002
INVENTOR(S) : Itzhak M. Itzhaky It is certified that error appears in the above-identified patent and that said Letters Patent is hereby corrected as shown below:

<u>Title page,</u>
Item [30], should read as follows:

--     [30]     Foreign Application Priority Data

Dec. 9, 1999    (DE) ................................. 199 59 341.8
       Dec. 21, 1999   (DE) ................................. 199 61 736.8 --.

Signed and Sealed this

Seventeenth Day of December, 2002

JAMES E. ROGAN
*Director of the United States Patent and Trademark Office*